United States Patent
Garcia et al.

(10) Patent No.: US 6,246,726 B1
(45) Date of Patent: Jun. 12, 2001

(54) HIGH SPEED DIGITAL DATA TRANSMISSION BY SEPARATELY CLOCKING AND RECOMBINING INTERLEAVED DATA SUBGROUPS

(75) Inventors: Enrique Garcia; Gregg Steven Lucas; Juan Antonio Yanes, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/514,025

(22) Filed: Feb. 25, 2000

Related U.S. Application Data

(62) Division of application No. 08/846,517, filed on Apr. 25, 1997.

(51) Int. Cl.[7] .................................................. H04L 27/04
(52) U.S. Cl. ............................ 375/295; 370/522; 375/354
(58) Field of Search ..................................... 375/295, 220, 375/225, 354; 370/503, 522, 510, 518; 345/113

(56) References Cited

U.S. PATENT DOCUMENTS

| | | | |
|---|---|---|---|
| 3,602,647 | * 8/1971 | Kawashima et al. | 179/15 BS |
| 5,105,444 | 4/1992 | Gard | 375/49 |
| 5,146,567 | * 9/1992 | Kao | 395/325 |
| 5,172,396 | 12/1992 | Rose, Jr. et al. | 375/107 |
| 5,297,276 | 3/1994 | Millar et al. | 395/550 |
| 5,329,532 | 7/1994 | Ikeda et al. | 371/22.3 |
| 5,495,596 | 2/1996 | Yau | 395/550 |
| 5,587,726 | 12/1996 | Moffat | 345/201 |
| 5,815,169 | 9/1998 | Oda | 345/517 |
| 5,822,553 | 10/1998 | Gifford et al. | 395/309 |
| 5,883,610 | 3/1999 | Jeon | 345/113 |
| 5,929,871 | 7/1999 | Komeichi | 345/521 |
| 6,091,783 | * 7/2000 | Garcia et al. | 375/295 |

* cited by examiner

Primary Examiner—Stephen Chin
Assistant Examiner—Mohammad Ghayour
(74) Attorney, Agent, or Firm—Dan Hubert & Assoc.

(57) ABSTRACT

To exchange a digital data input stream, a transmitter sends the digital data input stream to a receiver, and the receiver sequentially divides the stream into different interleaved substreams and later combines the substreams to provide an output including the original digital data input stream. The original digital data input stream includes multiple subgroups of data, such as bytes. Each subgroup is stored in a selected buffer of the receiver. Buffers are selected in a predetermined order of rotation to store sequentially received subgroups. Thus, each buffer receives subgroups in a defined order. Later, each buffer outputs its stored subgroups in the same order as received. A data assembler assembles the subgroups output by the various buffers, reconstructing the original digital input stream.

12 Claims, 3 Drawing Sheets

HIGH SPEED DIGITAL DATA TRANSMISSION BY SEPARATELY CLOCKING AND RECOMBINING INTERLEAVED DATA SUBGROUPS

This application is a Divisional of U.S. patent application Ser. No. 08/846,517, filed Apr. 25, 1997.

BACKGROUND OF THE INVENTION

1. Field of the Invention

The present invention relates to the transmission and receipt of digital data. More particularly, the invention concerns the exchange of a digital data input stream where a transmitter sends the digital data input stream to a receiver, the receiver sequentially dividing the stream into different interleaved substreams and later combining the substreams to reconstruct the original digital data input stream.

2. Description of the Related Art

Many electronic machines, such as computers, are made up of multiple different subcomponents. These subcomponents are often interconnected by a hardwired electrical connection such as a bus, etc. In many cases, however, some distance separates the subcomponents, preventing any convenient permanent electrical connection. Interconnected subcomponents may be separated by a few feet or even dozens of yards. Here, it is common to interconnect the remotely coupled subsystems using wires, cables, or another signal transmitting medium. These couplings are called "cable connections" in this application. Cable interconnections between subcomponents are crucial to the operation of these subcomponents as well as the overall system.

The transmission of data over cable interconnections is frequently coordinated with a clock signal, such as a square wave signal. As shown in FIG. 1, data transmissions are often broken down into multiple parts 100–105, such as bytes. Transmission and/or receipt of the individual bytes is coordinated by a clock signal. In the example of FIG. 1, the timing of each byte 100–105 has a one-to-one timing relationship with a rising edge of a clock signal 110.

Generally, it is desirable to transmit data as fast as possible to avoid delaying the operation of the subcomponents or the ultimate application program. Consequently, design engineers are constantly seeking faster and faster data rates. And, faster data rates require faster clock signals to synchronize transmission of the data, since each data byte requires a separate rising edge of the clock signal.

A number of problems can arise when a clock signal becomes too fast, however. For example, sufficiently high speed clock signals often have poorly defined edges, resulting in false clock cycle transitions. False transitions in a clocking signal may ultimately corrupt the data whose transmission depends upon the clock signal's accuracy. Therefore, the maximum data transmission speed is often limited by the maximum clock signal frequency.

SUMMARY OF THE INVENTION

Broadly, the present invention involves the exchange of a digital data input stream, where a transmitter sends the digital data input stream to a receiver, and the receiver sequentially divides the stream into different interleaved substreams and later combines the substreams to reconstruct the original digital data input stream.

More particularly, the original digital data input stream is first received by a communications module. The original digital data input stream includes multiple subgroups of data, such as bytes. Each subgroup is stored in a selected buffer of the communications module. Buffers are selected in a predetermined order of rotation to store sequentially received subgroups. Thus, each buffer receives subgroups in a defined order. Later, each buffer outputs its stored subgroups in the same order as received. A data assembler assembles the subgroups output by the various buffers, reconstructing the original digital input stream.

According to one implementation of the invention, multiple clock signals may be transmitted along with the original digital data input stream. There is a corresponding number of clock signals and buffers (or buffer regions); moreover, each clock signal has a data rate that is equal to the data rate of the original digital data input stream divided by the number of clock signals.

Each clock signal includes a respective plurality of clocking events, occurring at the specified data rate. The clocking events of the clock signals occur in rotation, one after another in a continuous order. The clocking events of each clock signal identify a different substream of data, interleaved with substreams identified by the other clock signals. The substream of data identified by each clock signal is stored in a separate buffer or buffer region. The data assembler coordinates outputing of the various buffers' substreams, and proper assembling of the substreams to reconstruct the original digital input stream.

Accordingly, in one embodiment, the invention may be implemented to provide a method to transmit and/or receive a digital data input stream. In another embodiment, the invention may be implemented to provide an apparatus such as a transmitter, receiver, or communications exchange subsystem. In still another embodiment, the invention may be implemented to provide a programmed product comprising signal-bearing media tangibly embodying a program of machine-readable instructions executable by a digital data processing apparatus to perform a method for transmitting and/or receiving a digital data input stream.

The invention affords its users with a number of distinct advantages. Chiefly, the invention enables communications subcomponents to exchange digital data without the difficulties that can accompany high speed clock signals. Briefly, this is achieved by using multiple, interleaved clock signals, each having a frequency less than the frequency of the data, to coordinate transmission and receipt of the data. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

Figure 2:
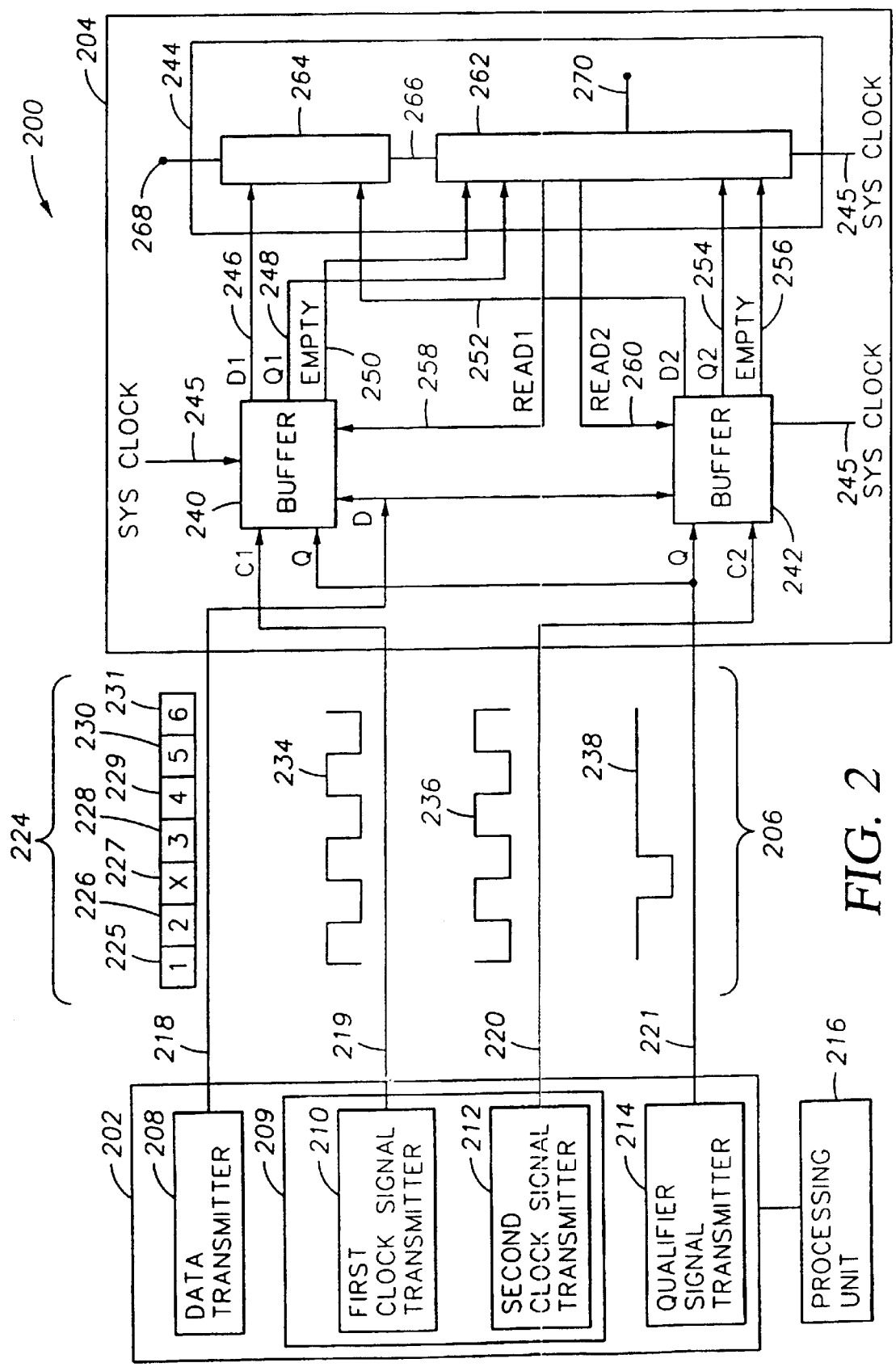
FIG. 2 is a block diagram depicting hardware components and interconnections of a communications exchange subsystem in accordance with one embodiment of the invention.

One aspect of the invention concerns a communications exchange subsystem, which may be embodied by various hardware components and interconnections as described in FIG. 2. The subsystem 200 includes a transmitter 202, a receiver 204, and a communications link 206 connecting the two.

Link

The communications link 206 may be provided by a number of different hardware components. For example, the link 206 may comprise a multi-conductor cable, fiber optic bundle, electromagnetic broadcast link, or any other suitable link for exchanging data.

The link 206 includes a number of sublinks, including a data sublink 218, multiple clock sublinks, and a qualifier sublink 221. In the illustrated example, there are two clock sublinks 219 and 220, since two clock signals are used. As the number of clock sublinks corresponds to the number of clock signals, there may be more clock sublinks than two in some applications.

In the preferred embodiment, the link 206 preferably comprises a cable made up of multiple shielded twisted pair conductors, such as copper wires.

Transmitter

Broadly, the transmitter 202 serves to send an original digital data input stream ("data stream") and other various related signals to the receiver 204 via the communications link 206. In the illustrated embodiment, the transmitter 202 comprises a communications adapter, which may be coupled to a processing unit 216. The processing unit 216, for example, may be a microprocessor or a central processing unit of a personal computer, mainframe computer, workstation, device controller, or another suitable digital data processing apparatus.

The transmitter 202 includes a number of subcomponents, including a data transmitter 208, multiple clock signal transmitters 209, and a qualifier signal transmitter 214. In the illustrated example, clock signal transmitter 209 generates two clock signals, and therefore comprises a first clock signal transmitter 210 and a second clock signal transmitter 212. The invention also contemplates the use of a larger number of clock signals, if desired.

Data Transmitter

The data transmitter 208 places an original digital data input stream 224 upon the data sublink 218. The data stream 224 includes multiple subparts 225–231, such as bytes. In one implementation, the data transmitter 208 may constitute the originating source of data represented by the data stream 224. As illustrated, however, the data transmitter 202 receives the represented data from the processing unit 216. In this embodiment, the data transmitter 208 reformats data from the processing unit 216 for transmittal on the data sublink 218 in the form of the data stream 224. This reformatting may involve, for example, providing the transmitted data with appropriate voltages and synchronizing transmittal of the data with the associated clock signals.

In the illustrated embodiment, where the data transmitter 208 reformats the data stream rather than generating it, the data transmitter 208 may be implemented using a field programmable gate array ("FPGA") such as the LUCENT brand ORCA 2C26.

Clock Signal Transmitters

The clock signal transmitters 209 provide clock signals to aid in receipt of the digital data input stream 224. As illustrated, the clock transmitters 210/212 provide clock signals 234/236, respectively. Each of the clock signal transmitters 210/212 provides a clock signal having predetermined clocking events that occur in some relation to the data stream 224. The data rate, or frequency, of these clocking events is the data rate of the data stream 224 divided by the number of clock signals. Thus, in the illustrated embodiment, where there are two clock signals, the frequency of each clock signal is half that of the data stream 224. With three clock signals, for example, each clock signal's frequency would be one third that of the data stream 224.

The clock signals may take a number of different forms, depending upon the particular application. As illustrated, the clock signals comprise square wave signals, where the predetermined clocking events comprise rising edges. The clocking events of the clock signals are staggered, so that the clock signals define succeeding subparts of the data stream 224 in rotation by their successive clocking events (e.g., rising edge). Thus, as illustrated, the first clock signal 234 defines one byte of the stream 224, the second clock signal 236 defines the next byte, and so on. Thus, the clocking events of the clock signals occur in rotation, one after another in a continuous order.

As an example, the clock signals may each run at 12.5 MHZ, although this frequency may be varied to suit the needs of the particular application. The clock signal transmitters 210/212 may be implemented using one or more FPGAs, such as the LUCENT brand ORCA 2C26. The clock signal transmitters 210/212 may be implemented in the same FPGA as the data transmitter 208, depending upon the needs of the application.

Qualifier Signal Transmitter

The qualifier signal transmitter 214 is an optional subcomponent of the transmitter 202 that provides a qualifier signal 238 indicating whether the data stream 224 contains data, or it is temporarily dormant. On a number of predictable occasions, the data stream may contain noise or otherwise invalid data. For example, the processing unit 216 may pause between sets of data, or the processing unit 216 may generate data slower than the data transmission rate, thus providing a bursty signal. Also, if the link 224 is connected to multiple receivers (not shown) in daisy chain fashion, a delay may occur between transmissions of data to different receivers.

Thus, the qualifier signal 238 indicates whether the data stream 224 contains data, or it is temporarily inactive. Preferably, a predetermined state of the qualifier signal indicates that data is present on the data sublink 218, and a different predetermined state indicates that no data is present. As illustrated, a logic "thigh" signal indicates data, and a logic "low" signal indicates no-data. The high and low signals may represent, for example, different voltages on the qualifier sublink 221 in accordance with TTL, RS-232, or another logic standard. As an example, the qualifier signal transmitter 214 may be implemented using one or more FPGAs, such as the LUCENT brand ORCA 2C26. Furthermore, the component may be implemented in the same FPGA as the data transmitter 208 and/or clock signal transmitters 209, depending upon the needs of the application.

Other Components

Although not shown, each of the components 208/210/212/214 preferably includes a line driver, to ensure that signals are placed on the link 206 with the appropriate voltages for reliable transmission thereon.

Receiver

Broadly, the receiver 204 functions to accept the data stream 224 from the link 206 and provide an output of this data upon a data output 268. This output may be directed to various other electronic components, in accordance with the needs of the specific application. The receiver 204 uses the clock signals 234/236 to extract substreams of the data stream 224, and then reassembles the substreams. Thus, instead of using one high speed clock to synchronize transmission of the data stream 224, the subsystem 200 uses two relatively slower clock signals 234/236, avoiding possible noise problems caused by a single high speed clock.

Although FIG. 2 only depicts one receiver 204, the invention also contemplates multiple receivers. The multiple receivers, for instance, may be interfaced to the transmitter 202 via a "daisy-chain" connection, also called a "multi-drop" configuration. Furthermore, the receiver 204 may be implemented in many different configurations. However, for explanatory purposes, the specific embodiment of receiver 204 shown in FIG. 2 is shown with components comprising multiple buffers 240/242 and a data assembler 244.

Buffers

The receiver 204 includes at least two buffers. As illustrated, two buffers 240/242 are shown. Each buffer may be a separate device, or a subregion of one or more common devices. Preferably, the buffers 240/242 comprise fast access buffers, such as first-in-first-out random access memory buffers. As an example, the buffers 240/242 may comprise INTEGRATED DEVICE TECHNOLOGY model 72801 memory circuits.

Each buffer includes a number of input lines to receive signals from the link 206. Both buffers receive the qualifier signal 238 and the data stream 224 on respective input lines. Each buffer also includes one input line for exclusively receiving one of the clock signals. In the illustrated example, the first buffer 240 receives the first clock signal 234, and the second buffer 242 receives the second clock signal. The buffers 240/242 also receive a clocking signal from a system clock 245. The buffers 240/242 also include respective command lines 258/260 to receive command instructions from the data assembler 244, as discussed in further detail below.

Each buffer also includes a number of output lines, the function of which is discussed in greater detail below. Each buffer includes a data output line, a qualifier output line, and an empty indicator line. More particularly, the buffer 240 includes a data output line 246, a qualifier output line 248, and an empty indicator line 250. The buffer 242 includes a data output line 252, a qualifier output line 254, and an empty indicator line 256.

Data Assembler

The output lines 246–256 and the command lines 258/260 are all coupled to the data assembler 244. The data assembler 244 manages the retrieval of data from the buffers 240/242 in order to recreate the original digital data input stream 224.

The data assembler 244 includes a controller 262 and a selectively activated gate 264. The controller 262 manages the output of the buffers 240/242, this output being fed to the gate 264. Accordingly, the controller 262 also manages the gate 264 so that it provides the signal from the proper buffer 240/242 on the data output 268. Management of the gate 262 is achieved via a select line 266.

The controller 262 preferably comprises a state machine implemented by hardware logic circuitry such as a FPGA, or alternatively implemented by a digital data processor such as a microprocessor or other suitable digital data computing unit. The gate 264 preferably comprises a multiplexer, such as a 2:1 multiplexer in the illustrated example. The signal on the select line 266 determines whether the data output 268 receives signals from the data line 246 or the data line 252.

The controller includes a valid-data output 270, which provides a signal indicating whether the signal on the data output 268 is valid, as discussed in greater detail below.

Exemplary Implementation

As an example of one implementation, the subsystem 200 may be implemented in a direct access storage device ("DASD") subsystem such as an IBM RAMAC-3 product, where data is stored and retrieved using magnetic disk drives. One example of such a subsystem is the IBM model 9391 device rack.

In this embodiment, the processing unit 216 is implemented in a storage controller, such as an IBM model 9390. The storage controller is coupled to a DASD controller, which is connected in daisy-chain fashion to one or more DASD storage drawers. The DASD controller and DASD storage drawers each include a transmitter 202 and receiver 204 for controller-drawer communications. In this embodiment, the link 206 also includes an address line (not shown), to facilitate selection of a target device for each transmission.

Other uses include local area networks, data processing environments, and any application requiring extremely fast and accurate data transmission.

Operation

In addition to the various hardware embodiments described above, a different aspect of the invention concerns a method for receiving a digital data input stream by sequentially dividing the received stream into different interleaved substreams and later combining the substreams to reconstruct the original digital data input stream. A different, but related method involves transmitting the data stream along with accompanying signals such as multiple clock signals and a qualifier.

Signal-Bearing Media

These methods may be implemented, for example, by operating a digital data processing machine to execute a program of machine-readable instructions. In one case, components of the transmitter 202 may execute a program for transmitting the data stream along with accompanying signals such as multiple clock signals and a qualifier. Similarly, the components of receiver 204 may sequentially divide a received digital data input stream into different interleaved substreams and later combine the substreams to reconstruct the original digital data input stream.

These programming instructions may reside in various types of signal-bearing media, accessible to the appropriate one of the transmitter 202 and receiver 204. In this respect, one aspect of the present invention concerns a programmed product, comprising signal-bearing media tangibly embodying a program of machine-readable instructions executable by a digital data processor to perform method steps to transmit and/or receive digital data.

Figure 1:
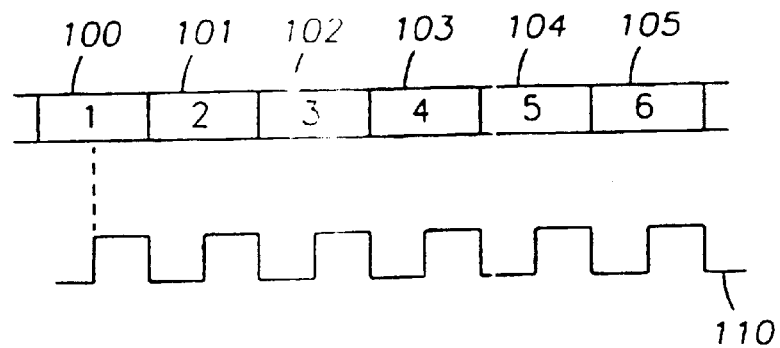
FIG. 1 is a timing diagram showing the relationship between a data stream and a corresponding clock signal as known in the art.
Figure 3:
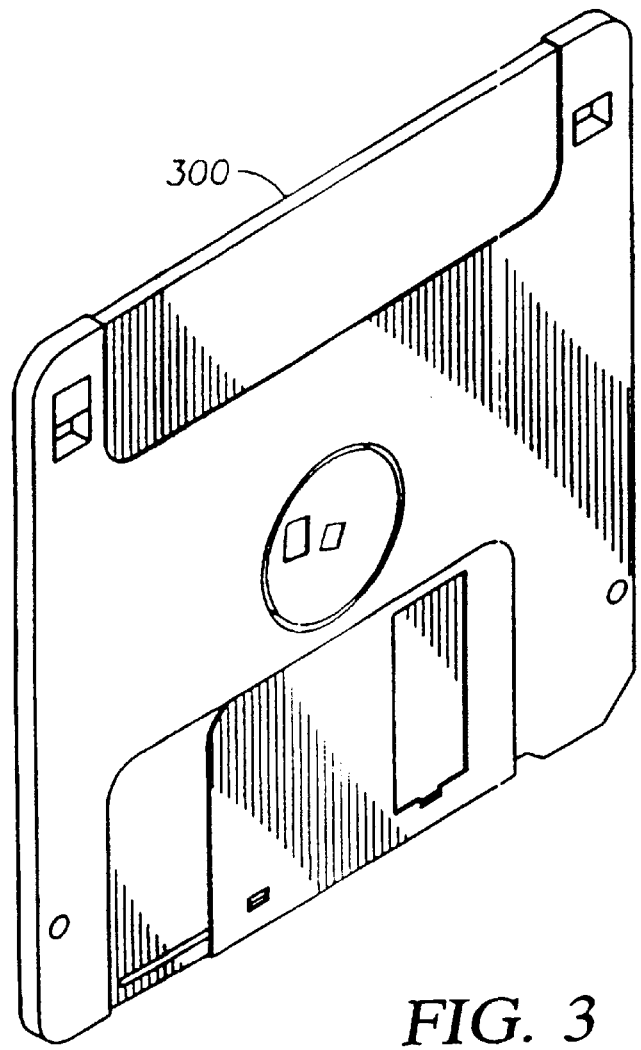
FIG. 3 is a perspective view of an article of manufacture according to one embodiment of the invention.

These signal-bearing media may comprise, for example, RAM modules contained within the transmitter 202 or receiver 204. Alternatively, the instructions may be contained in another signal-bearing media, such as a magnetic data storage diskette 300 (FIG. 3). The programming instructions may instead be stored on a variety of other types of data storage media, such as DASD storage (e.g., a conventional "hard drive" or a RAID array), magnetic tape, electronic read-only memory (e.g., CD-ROM or WORM), optical storage device (e.g. WORM), paper "punch" cards, or other signal-bearing media including transmission media such as digital and analog and communication links and wireless. In an illustrative embodiment of the invention, the machine-readable instructions may comprise lines of compiled microprocessor assembly language code.

Overall Sequence of Operation

Figure 4:
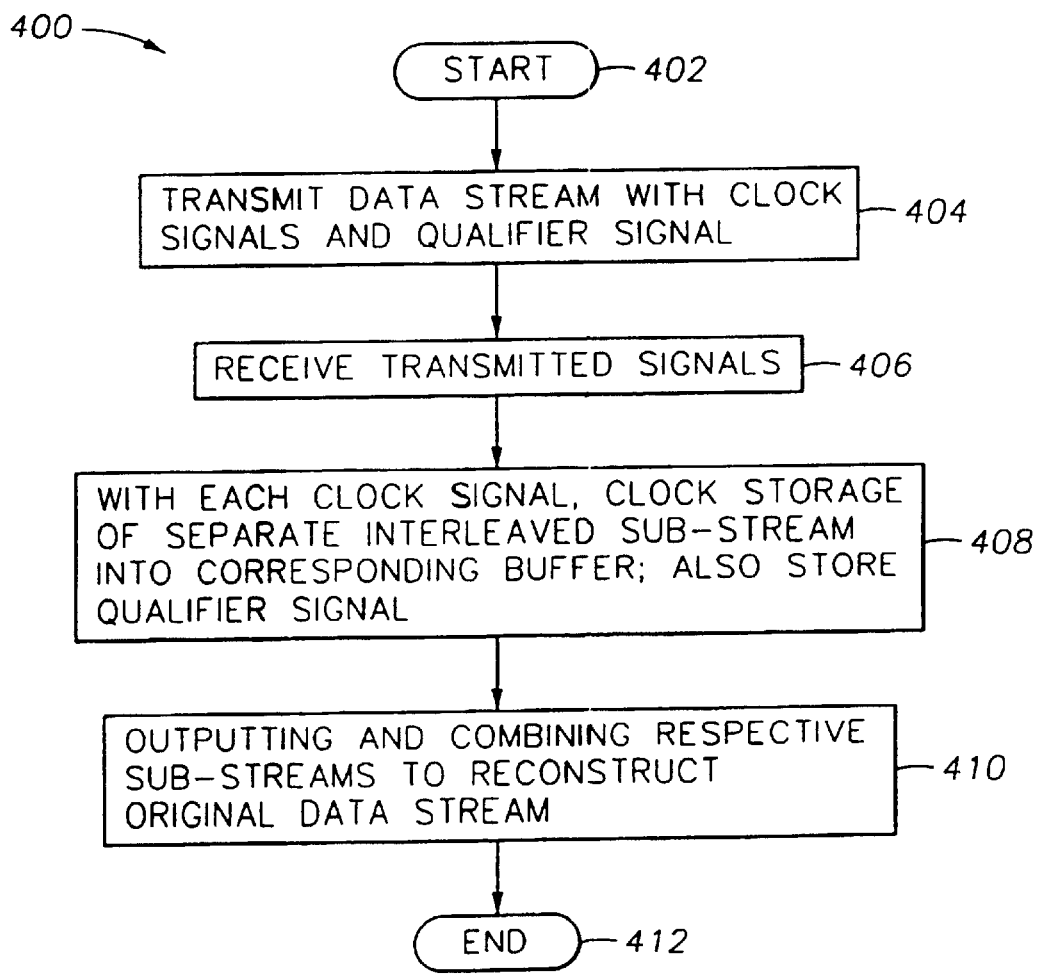
FIG. 4 is a flowchart showing one exemplary operational sequence for conducting a communications exchange according to the invention.

FIG. 4 shows a sequence of method steps 400 to illustrate one example of the method aspect of the present invention. For ease of explanation, but without any limitation intended thereby, the example of FIG. 4 is described in the context of the communications exchange subsystem 200 described above. The steps 400 are initiated in step 402, when the subsystem 200 experiences a request to exchange data over the link 206.

Transmission

In step 404, the transmitter 202 transmits the original digital data input stream 224 with the accompanying clock signals and qualifier signal. This is achieved by the data transmitter 208, clock signal transmitters 210/212, and qualifier signal transmitter 214 simultaneously transmitting the data stream 224, first clock signal 234, second clock signal 236, and qualifier signal 238.

In the illustrated embodiment, the rising edges of the first clock signal 234 identify every other byte of the data stream 224. The intervening bytes are identified by the second clock signal 236, which is 180° out of phase with respect to the first clock signal 234. Each clock signal 234/236 by its timing thus identifies a different, but completely interleaved, data substream.

Receipt and Storage

The signals 224/234/236/238 pass across the link 206, and are subsequently received at the receiver 204 in task 406. In task 408, the receiver 204 stores the received signals as follows. Namely, the rising edges of the first clock signal 234 clock storage of the corresponding substream (bytes 225, 227, 229, and 231) in the first buffer 240. Each rising edge of the first clock signal 234 also triggers the buffer 240 to store the value of the qualifier signal 238 at that time.

Similarly, the rising edges of the second clock signal 236 clock storage of the corresponding substream (bytes 226, 228, and 230) in the second buffer 242. The second clock signal 236 also triggers storage of the value of the qualifier signal 238 in the buffer 242 at each rising edge.

Reconstructing Original Digital Data Input Stream

After step 408, the receiver 204 in step 410 outputs the respective substreams from the buffers 240/242 and integrates the substreams to recreate the original digital data input stream 224, as follows. The controller 262 alternatively elicits a byte of data from each of the buffers 240/242.

First, the controller 262 sends a read command to the buffer 240 on the command line 258. This causes the buffer 240 to output a byte of stored data (on the line 246), a byte of the stored qualifier signal (on the line 248), and an empty signal (on the line 250) if the buffer is empty. The controller 262 also places an appropriate signal on the select line 266 so that the gate 264 places data from the data line 246 (rather than the line 252) upon the data output 268.

Concurrently, the controller 262 provides a predetermined signal (such as a logical "one") on the valid-data output 270 if the data from the line 246 is valid. In the illustrated example, this data is valid if (1) the empty indicator line 250 shows that the buffer 240 is not empty, and (2) qualifier line 248 shows that the line 246 contains data, rather than noise or another non-signal occurring during a period such as 227. Outputing the qualifier signal with the data stream preserves the relationship between these two signals, so that the qualifier signal still indicates whether the data on the line 246 represents data.

Next, the controller 262 sends a read command to the buffer 242 on the command line 260. This causes the buffer 242 to output a byte of stored data (on the line 252), a byte of the stored qualifier signal (on the line 254), and an empty signal (on the line 256) if the buffer is empty. The controller 262 also places an appropriate signal on the select line 266 so that the gate 264 places data from the data line 252 upon the data output 268.

Concurrently, the controller 262 provides a predetermined signal (such as a logical "one") on the valid-data output 270 if the data from the line 252 is valid. In the illustrated example, this data is valid if (1) the empty indicator line 256 shows that the buffer 242 is not empty, and (2) qualifier line 254 shows that the line 252 contains data, rather than noise or another non-signal occurring during a period such as 227. Outputing the qualifier signal with the data stream preserves the relationship between these two signals, so that the qualifier signal still indicates whether the data on the line 252 represents data.

The foregoing sequence is repeated, alternatively selecting between the buffers 240 and 242 to provide a continuous stream of data from the lines 246/252. When appropriate, the controller 262 provides a signal on the valid-data output 270 to alert the recipient that data presently output at 268 is not valid.

Clocking of data from the buffers 240/242 is conducted according to the system clock 245. Unlike the clocks 234/236, this clock may have a data rate corresponding to the original digital data input stream 224, or faster if desired. This is because the transmission-related edge problems confronting the clock signals 234/236 do not apply to the system clock 245, which is local to the receiver 204.

Following step 410, the routine 400 ends in step 412.

Use of Qualifier Signal

The qualifier signal 238 may be omitted from the subsystem 200 if desired. In this embodiment, periods of invalid or no-data in the data stream 224 are simply be unclocked, i.e., the clock signals 234/236 would not be provided. This avoids clocking possibly erroneous data. However, when valid data comes across the sublink 218 once again, restarting the clock signals 234/236 might cause certain problems. Since the clock signals are not yet at steady state, there may be first incident switching noise, causing a corrupted clock edge.

Thus, the use of the qualifier signal enables the clock signals 234/236 to run continuously, irrespective of valid data (or not) on the sublink 218. For many applications, having "free running" clocks is a particular advantage.

The qualifier signal may also be used in a number of different ways. For example, the controller 262 may disable the gate 264 when the qualifier signal provides a no-data indication. This may be achieved using any suitable logic gate, for example. As another alternative, the qualifier signal may be used to prevent storage of signals from the data stream 224 that do not represent any data. For instance, if a logic "one" indicates data, the qualifier signal may be ANDed with the respective clock signal 234/236 in each buffer 240/242. Thus, during periods of no-data, the contents of the data sublink 218 would not be clocked into the buffers 240/242 for storage therein.

Preferably, subparts of no-data such as the subpart 227 are implemented in even numbers, e.g., two, four six, etc. In this way, valid data always emanates from the buffers 240/242 in alternating sequence.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for transmitting a digital data input stream comprising multiple data subgroups, said method comprising:
   transmitting the digital data input stream to a communications module, said input stream including multiple subgroups and having a data rate; and
   transmitting a predetermined plural number N of clock signals to the communications module concurrently with transmission of the input stream, each clock signal including predetermined clocking events occurring at a rate of 1/N multiplied by the data rate, wherein the clock signals sequentially exhibit clocking events in rotation.

2. The method of claim 1, the predetermined number N being two.

3. The method of claim 1, every subgroup having a single fixed size.

4. The method of claim 3, each subgroup comprising a byte of data.

5. The method of claim 1, the clock signals comprising rectangular wave signals, the clocking events comprising a predetermined edge of the rectangular wave signals.

6. The method of claim 1, the predetermined number N of clock signals being two, the clock signals including first and second clock signals, the second clock signal being shifted in phase 180 degrees with respect to the first clock signal.

7. The method of claim 1, further comprising:
   transmitting a qualifier signal to the communications module concurrently with transmission of the input stream and the clock signals, the qualifier signal having a predetermined condition when the input stream represents invalid data.

8. The method of claim 7, the predetermined condition comprising a predetermined voltage.

9. A method of exchanging data, comprising:
   transmitting an original digital data input stream from a first communications component to a second communications component, the original digital data input stream having multiple subparts whose occurrence defines a first data rate;
   along with the input stream, the first communications component transmitting a multiple number N of clock signals to the second communications component, each having a plurality of clocking events occurring at a rate of 1/N times the first data rate, wherein clocking events of the different clock signals occur in rotation among the clocking signals;
   the second communications component receiving the original digital data input stream and the clock signals;
   the second communications component utilizing the clock signals to designate a corresponding number of substreams of the original digital data input stream and storing each designated substream in a different buffer;
   each buffer outputing its respective substream; and
   the second communications component integrating the substreams to provide an output comprising the original digital input stream.

10. A data transmitter, comprising:
    a communications interface including an attachment shaped to be coupled to a communications line; and
    a processing unit coupled to the communications interface, the processing unit programmed to perform a method for transmitting a digital data input stream comprising multiple data subgroups, said method comprising:
       transmitting the input stream via the communications interface, said input stream including multiple subgroups and having a data rate; and
       transmitting a predetermined plural number N of clock signals via the communications interface concurrently with transmission of the input stream, each clock signal including predetermined clocking events occurring at a rate of 1/N the data rate, wherein the clock signals sequentially exhibit clocking events in rotation.

11. The data transmitter of claim 10, the processing unit comprising a microprocessor.

12. A data transmitter, comprising:
    a communications interface means including an attachment means for coupling to a communications line; and
    a processing means coupled to the communications interface means for transmitting a digital data input stream comprising multiple data subgroups by:
       transmitting the input stream via the communications interface means, said input stream including multiple subgroups and having a data rate; and
       transmitting a predetermined plural number N of clock signals via the communications interface means concurrently with transmission of the input stream, each clock signal including predetermined clocking events occurring at a rate of 1/N the data rate, wherein the clock signals sequentially exhibit clocking events in rotation.

* * * * *

UNITED STATES PATENT AND TRADEMARK OFFICE
CERTIFICATE OF CORRECTION

PATENT NO. : 6,246,726 B1  Page 1 of 1
DATED : June 12, 2001
INVENTOR(S) : Garcia et al.

It is certified that error appears in the above-identified patent and that said Letters Patent is hereby corrected as shown below:

Column 2,
Line 24, change "outputing" to -- outputting --

Column 7,
Line 62, change "Outputing" to -- Outputting --

Column 8,
Line 35, delete "be" between "simply" and "unclocked"

Column 9,
Line 50, delete "first" between "the" and "data"

Column 10,
Line 9, change "outputing" to -- outputting --
Line 28, change "of 1/N the data" to -- of 1/N times the data --
Line 46, change "of 1/N the data" to -- of 1/N times the data --

Signed and Sealed this

Thirtieth Day of July, 2002

*Attest:*

*Attesting Officer*

JAMES E. ROGAN
*Director of the United States Patent and Trademark Office*